(12) United States Patent
Bilger et al.

(10) Patent No.: US 6,317,835 B1
(45) Date of Patent: Nov. 13, 2001

(54) METHOD AND SYSTEM FOR ENTRY OF ENCRYPTED AND NON-ENCRYPTED INFORMATION ON A TOUCH SCREEN

(75) Inventors: Aaron Bilger, Roswell; Michael Dudgeon, Kennesaw; Michael C. Finley, Duluth; John Wade, Alpharetta, all of GA (US)

(73) Assignee: Radiant Systems, Inc., Alpharetta, GA (US)

( * ) Notice: Subject to any disclaimer, the term of this patent is extended or adjusted under 35 U.S.C. 154(b) by 0 days.

(21) Appl. No.: 09/220,215

(22) Filed: Dec. 23, 1998

(51) Int. Cl.[7] .................................................. G06F 11/30
(52) U.S. Cl. ........................ 713/194; 380/52; 713/190; 713/200
(58) Field of Search ..................... 713/193–194, 713/183, 190, 200; 380/52; 705/16, 18, 25; 345/173

(56) References Cited

U.S. PATENT DOCUMENTS

| | | |
|---|---|---|
| 4,720,781 | 1/1988 | Crossland et al. . |
| 4,962,530 | 10/1990 | Cairns . |
| 5,379,057 | 1/1995 | Clough et al. . |
| 5,420,936 | 5/1995 | Fitzpatrick et al. . |
| 5,450,078 | 9/1995 | Silva et al. . |
| 5,515,540 * | 5/1996 | Grider et al. ......................... 713/200 |
| 5,563,945 * | 10/1996 | Gercekci ............................. 713/190 |
| 5,675,362 | 10/1997 | Clough et al. . |
| 5,710,814 | 1/1998 | Klemba et al. . |
| 5,768,386 * | 6/1998 | Yokomoto et al. ................... 713/183 |
| 5,790,670 * | 8/1998 | Bramlett ................................ 380/52 |
| 5,802,175 | 9/1998 | Kara . |
| 5,892,826 * | 4/1999 | Brown et al. ......................... 713/190 |
| 5,970,146 * | 10/1999 | McCall et al. ........................ 713/194 |

* cited by examiner

*Primary Examiner*—Gail Hayes
*Assistant Examiner*—Ho S. Song
(74) *Attorney, Agent, or Firm*—Needle & Rosenberg, P.C.

(57) ABSTRACT

The present invention is directed to a touch screen system and method for entry of encrypted and non-encrypted information. The system and method comprise a sensing means for detecting the coordinates of a touch on the touch screen device, a toggling means for toggling between encryption and non-encryption mode, and a processing means for encrypting data associated with the coordinates of the touch and transmitting the encrypted or non-encrypted data to a remote processor.

27 Claims, 4 Drawing Sheets

Secure touch controller with resistive technology touch screen

METHOD AND SYSTEM FOR ENTRY OF ENCRYPTED AND NON-ENCRYPTED INFORMATION ON A TOUCH SCREEN

BACKGROUND OF THE INVENTION

1. Field of the Invention

The present invention relates to a method and system for using a touch screen as a conventional touch screen and also as a cryptographic Personal Identification Number (PIN) Entry Device (PED).

2. Description of the Prior Art

There are two defacto industry standards for user input in public access devices. The use of each standard depends on the application as each has a specific purpose. The two technologies are touch screen and a keyboard for entry of a personal identification number (PIN pad). Examples of touch screens include information kiosks, custom greeting card do-it-yourself terminals, fast food self-order terminals, etc. PIN pads may be used anywhere a debit card may be used such as grocery store checkout lane terminals, Automatic Teller Machines (ATM), and gasoline dispensers. Usually PIN pads are configured like a telephone key pad and the user enters an access code that is packaged and sent to a remote processor for validation.

Choosing one type of public device over the other means sacrificing functionality to the user. If a touch screen is selected, a debit card or any other payment method requiring an encrypted digital signature such as passive debit cards cannot be accepted for payment at the terminal. The reason for this is security. Any machine that requires an encrypted digital signature such as a user's personal identification code must include security measures to prevent unauthorized access to the code. On the other hand, if a PIN pad is chosen, the user must translate a request for input from a screen to input on a numeric keypad. This type of interface is non-intuitive to the user as it diverges from the familiar point-and-click interaction model of modern applications.

To overcome the shortcomings of each, many systems include both a touch screen and a keypad. This combination of an interface is also non-intuitive to the user as some input is entered on the touch screen and other input is entered on the keypad.

SUMMARY OF THE INVENTION

The present invention is directed to a system and method that coalesces a touch screen and a PIN pad into a single secure device that meets the requirements of both. The system and method includes advantages of each system with a small cost increase and requires low maintenance. The system and method selectively generates encrypted and non-encrypted data within a touch screen device and transmits the data to a remote processor. The system and method comprises a sensing means for detecting the coordinates of a touch on the touch screen device, a toggling means for toggling between an encryption and non-encryption mode, and a processing means for encrypting data associated with the coordinates of the touch and transmitting the encrypted data to a remote processor, if the toggling means is in the encryption mode, or transmitting data associated with the coordinate of the touch in an unencrypted format to the remote processor, if the toggling means is in the non-encryption mode.

DETAILED DESCRIPTION OF THE INVENTION

Figure 1:
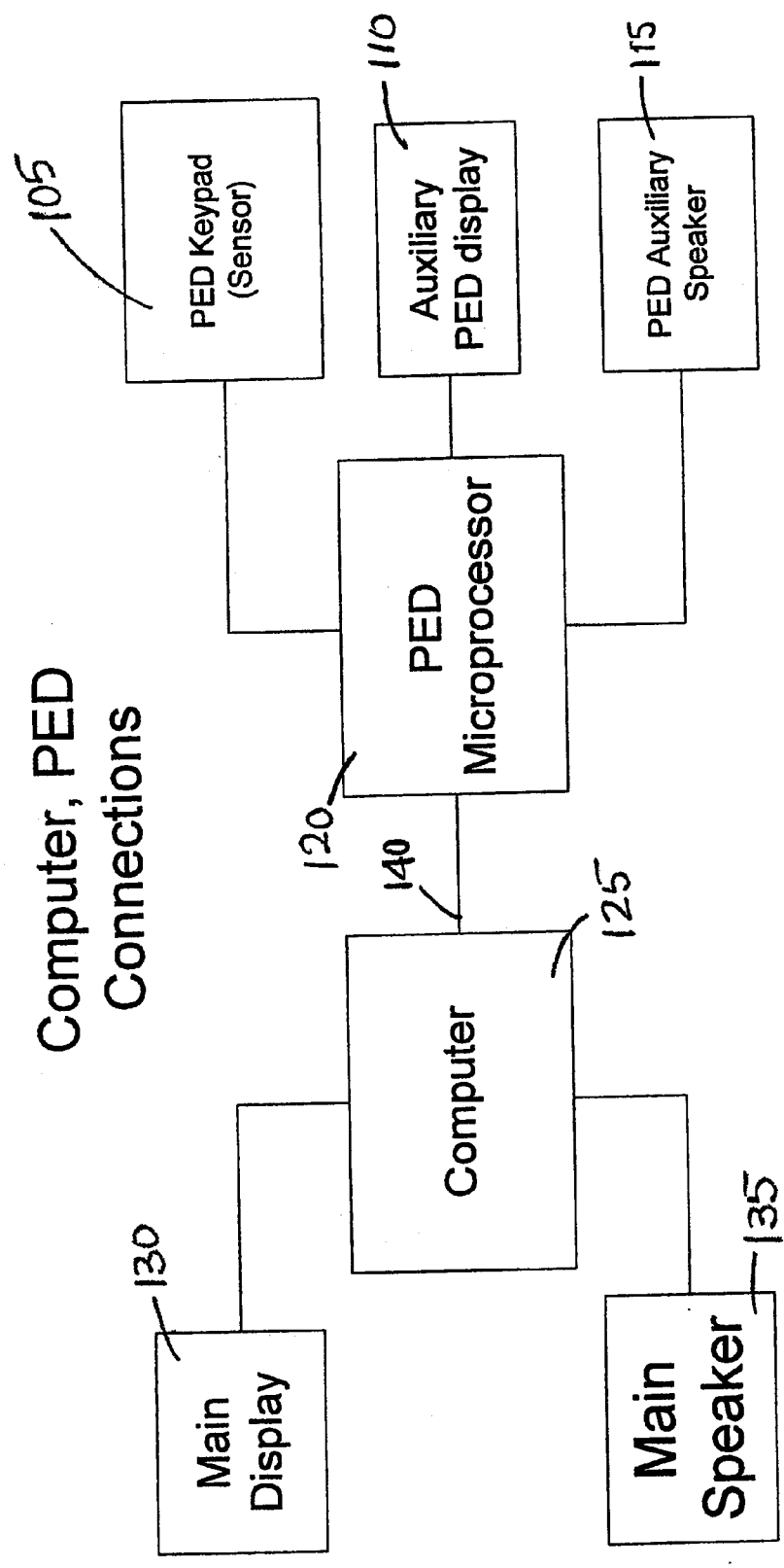
FIG. 1 is a block diagram illustrating the components of a PIN Entry Device (PED).

To understand the invention, each system, a touch screen and a PIN entry device must first be explained. As shown in FIG. 1, PIN entry devices (PED) typically consist of a keypad 105 of twelve keys (0–9, ENTER, CLEAR) in a three by four key grid, similar to a phone keypad. The PED typically also has a small auxiliary display 110 (usually less than four lines by twenty characters), an auxiliary beep speaker 115, and a connection port 140 to a computer where the application program resides. The PED has a microprocessor 120 that connects all of these together, taking input from the keypad 105, providing feedback on the display 110, and sending it to the computer 125 for processing. The microprocessor 120 may also operate in an encrypted mode whereby it accumulates several keystrokes without sending these to the application program. Instead, it waits for the ENTER key to be pressed and then performs an encryption algorithm on the accumulated inputs. The data sent to the application program is an encrypted PIN block that can only be deciphered by a remote payment authorization computer.

There are many industry, government, and international regulations that govern the design of PEDs. These regulations govern how the keys are arranged, the color of the keys, how the keys must be displayed, how the components are physically housed, etc. These regulations are aimed at preventing an unauthorized user from accessing information that would allow theft or fraud. In general, a PED must be designed and manufactured to have a standard level of physical security, it must meet cryptographic requirements, and it must be handled under strict policies at all times.

Figure 2:
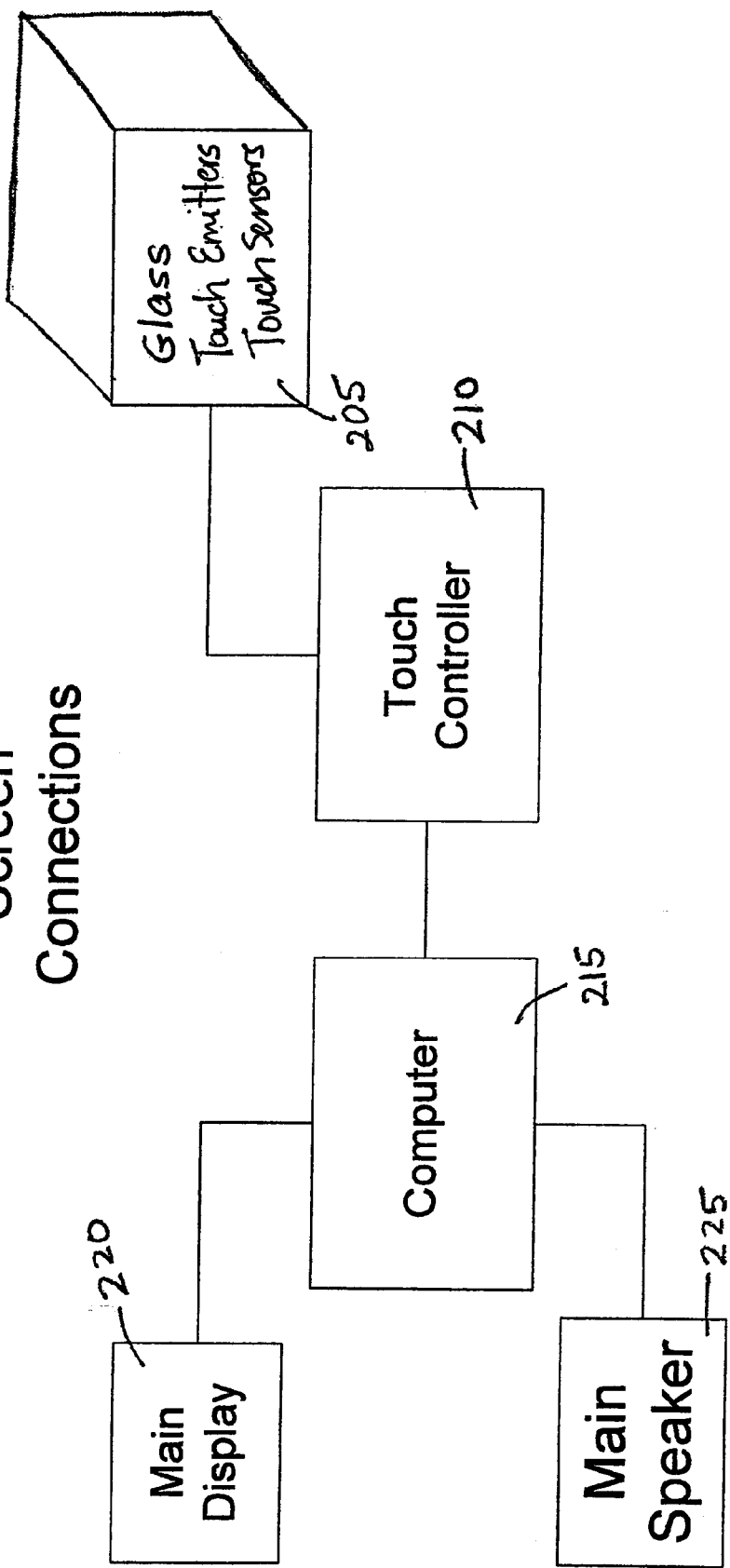
FIG. 2 is a block diagram illustrating the components of a touch screen.

FIG. 2 is a block diagram illustrating the components of a touch screen. Touch screens allow a user to interface with a machine by touching an electronic touch target on the glass itself. Touch screens generally comprise of a glass with a series of emitters and sensors 205, and a touch controller 210. For example, in the touch technology typically called "infra red" due to the nature of the light emitted by the sensors, the touch is electronically located through emitters that are connected to horizontal and vertical sensors located along a horizontal side and a vertical side of the glass. When the user's finger touches the glass, the finger block emitters opposite the sensors record where the glass was touched as well as the type of interaction (new interaction, continued interaction, concluded interaction). There are other types of touch technology such as resistive, capacitive, acoustic, and the infra red example is only given for illustrative purposes and is not intended to limit the scope of this invention.

The touch controller 210 may determine the coordinates of where the screen was touched from the vertical and horizontal sensor that recorded the touch. The touch controller 210 then outputs the coordinates and the type of interaction to the computer 215. The application program typically performs a calibration step that translates the output from the touch controller 210 (coordinates and type of interaction) into the screen display coordinate system. The application program then uses the screen display coordinate system with what is displayed on the screen at those coordinates to determine the user's input.

In general, a touch screen and a PED are similar at the high level. There is a user, a sensor to detect the user's input, a processor, an application program, and a subsequent action. For example, using a PED, a user presses ENTER, the keypad sensor detects that ENTER was pressed, the processor detects the end of cryptographic input, performs encryption and sends the PIN block to the computer, the computer receives the PIN block and displays "PLEASE WAIT" to the user. In a touch screen, the user removes their finger from the screen, the touch sensor changes the signal to indicate that no interaction is taking place, the touch controller detects end of interaction and uses the last coordinate before the interaction ended, the computer receives the last coordinate with touch type of "end of interaction" and calibrates the coordinates, cross-references to current contents of screen and determines that the user has ended his interaction. The computer then displays the next menu option based on the user's selection.

There are also dissimilarities between a PED and a touch screen. Whereas a PED is typically connected to a display device as well as to a sensor, the touch screen controller has no display connection. Whereas the PED returns the user's input to the computer (such as a specific key), the touch controller returns a set of numbers that must then be calibrated, cross-referenced to screen contents and processed by the computer in the context of what is currently displayed on the screen. Whereas the PED operates under many standards and controls at every level, there are no touch screen standards or controls at any level. Finally, whereas the PED can accumulate several user events, combine them, and encrypt them, the touch controller returns input in the most basic granular form possible for the computer to process.

Figure 3:
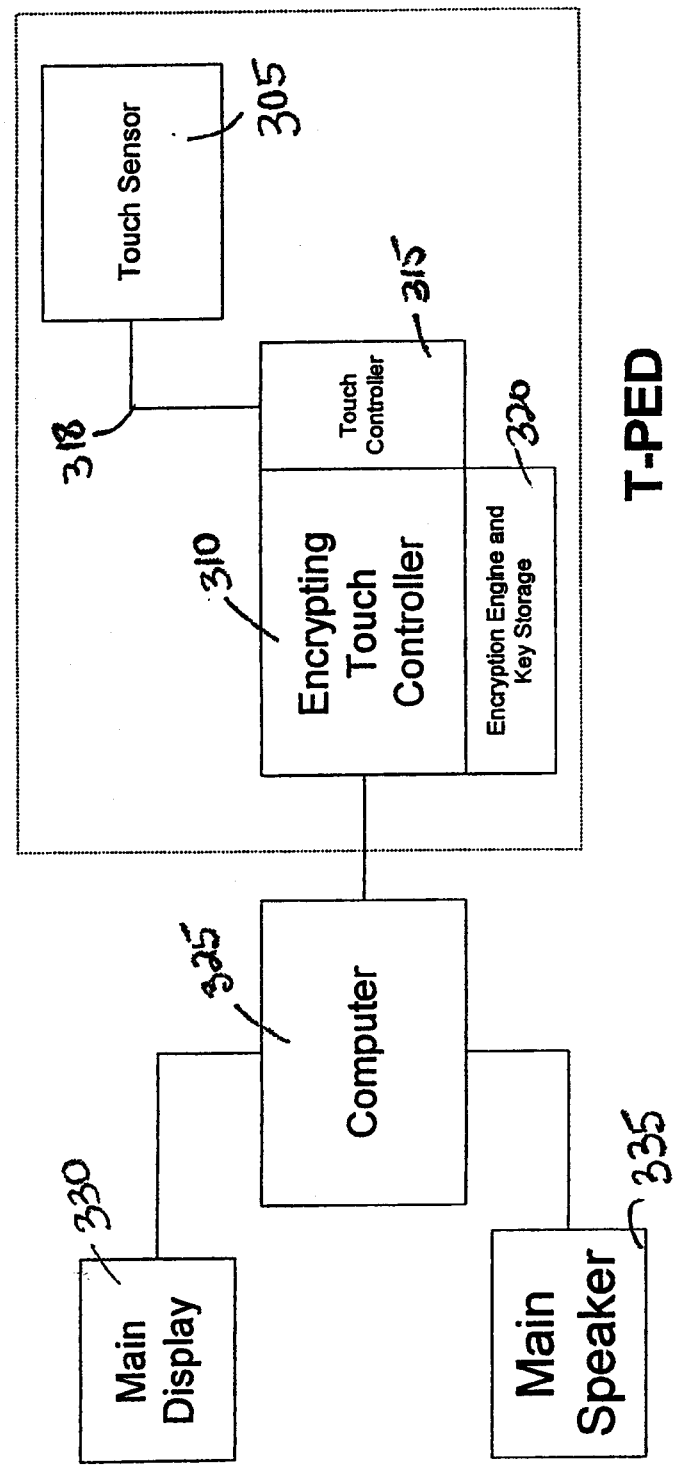
FIG. 3 is a block diagram illustrating the components of the present invention.

FIG. 3 is a block diagram of the present invention that combines a PED and touch screen components. To combine the technologies of a PED and a touch screen, a sensor must first be chosen. Since an advantage of the touch screen is the flexibility of its sensor, the touch sensor 305 is the desired sensor for a combined device. To meet the security requirements of a PED, the connection 318 between the sensor and the touch controller must be physically secure such that an attack to monitor the signal between the sensor and the touch controller is deterred.

Figure 4:
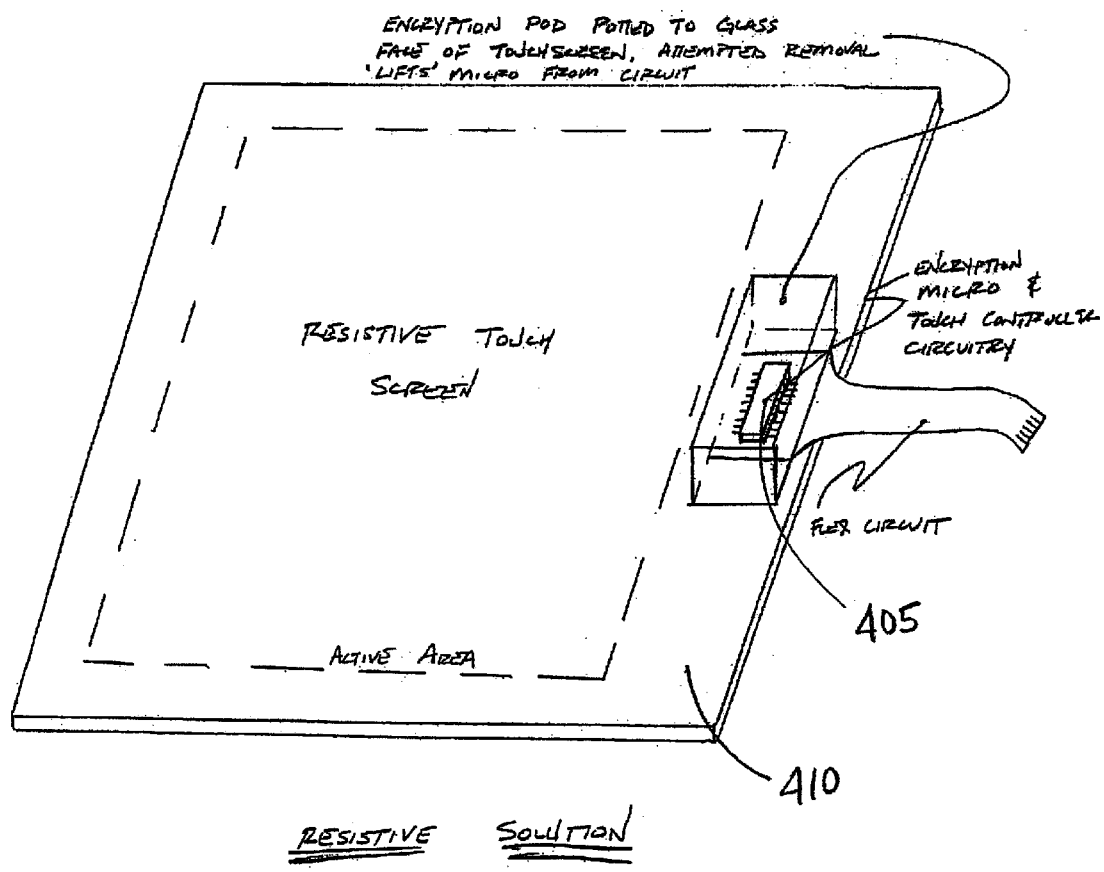
FIG. 4 is a schematic illustrating a secure touch controller with a touch screen that utilizes resistive technology.

As shown in FIG. 4, in the preferred embodiment, for resistive and infrared sensors that have easily decoded sensor connections, the touch controller 405 may be securely mounted directly on the touch sensor 410 and 'potted' with a substance such as epoxy to form a solid physical block. Since the sensor 410 and controller 405 are a single block, their interconnection is not exposed for tampering. Any attempt to tamper with the device would result in destruction of the sensor or the electronics. For other technologies such as acoustic wave, capacitive, or any other wave analog form technology, the sensor to controller connection is intrinsically tamper resistant because the signal is a reflection of the carrier produced by the controller. Any tampering or tapping of the connections would sufficiently modify the signal or the carrier such that the sensor would cease to operate. This is an acceptable mode of protection in the industry. For non-resistive touch technologies, the cable end may be bonded to prevent unauthorized replacement of the touch glass, but not directly bonded to the glass. Note that for non-resistive touch technologies, although the touch controller is not bound to the touch glass, the touch controller would still be encased in epoxy or potted to form a solid tamper proof block.

To meet the operational requirements of a PED, the preferred embodiment may include a microprocessor that is able to perform the combinatorial and cryptographic functions. Since the touch screen sensor is used, the preferred embodiment must also include a touch controller. The microprocessor and the touch controller are similar devices that can be combined into a single general purpose unit that performs the functions of both, saving cost and complexity in the system while raising the level of physical security.

In the preferred embodiment, the combined microprocessor and touch controller is called the 'Encrypting Touch Controller' or ECT 310. Because the ECT includes the touch controller, it may have to be physically secure to the touch sensor if the sensor is resistive or infrared, as discussed earlier. Also, because the ECT 310 contains the microprocessor, it must be resistant to tampering. In the preferred embodiment, resistence to tampering is achieved through the use of fit-for-purpose microprocessors that are standard in the industry such as an 8051-based microcontroller using address encryption and self-descruting circuitry. These standard devices may have metalic layers built into the microprocessor that cause destruction of the microprocessor when mechanically violated. Furthermore, these devices include memory-zeroing circuitry that is enabled when physical access to the overall package is detected. In addition, some of these devices include encrypted programming instructions and encrypted bus addresses as a further deterrent. If the touch sensor technology and electronics availability does not allow the sensor to be completely contained within the die of the microprocessor, potting of the assembly will serve to protect its contents from probing or violation.

In the preferred embodiment the ECT may also include an encryption engine and key storage 320. The encryption engine 320 may utilize any encryption algorithms, some of which include the Data Encryption Standard (DES) and the Derived Unique Key Per Transaction (DUKPT). The encrypted data that is stored may be a Personal Identification Number (PIN) or a fleet card number such as that used by a truck driver in a fleet.

In the preferred embodiment, the ECT may be connected to a remote computer 325 that may contain a main display 330 and a main speaker 325. The computer 325 may be a remote processor that controls a pay terminal or an entry order terminal. Pay terminals and entry order terminal may be a gasoline dispenser, a public access terminal, a food ordering terminal or a ticket purchasing terminal.

As in both the touch screen and PED implementations, the ECT 310 communicates with the application program residing on the computer. This allows the ECT 310 to perform interactions as needed by both PED and touch screen devices. The ECT 310 therefore performs the following finctions:

Decoding touch sensor signal 318 into coordiantes;
Securely storing cryptographic keys;
Securely performing encryption; and
Interacting with computer 325.

The preferred embodiment must operate both as a conventional touch screen device and as a PED device (T-PED). This dual role requires that the preferred embodiment of the T-PED operate modally under the control of the application program or computer. Sometimes the desired behavior of the T-PED is to operate as a secure PED device, while other times it is desirable that it act as a simple touch screen pointer device. This is achieved through a protocol that the T-PED uses to communicate with the application program. This protocol supports the transfer of information related to touch input and cryptographic entry.

The protocol command that instructs the type of finctionality the touch screen will perform is the "Input Mode Select" command. This command bridges the gap between the two input device types that the T-PED replaces. The "Input Mode Select" may be set to "select PIN mode" or "Select Clear Mode".

If the desired mode of operation is PIN entry, the Input Mode Select command from the computer must contain enough information to allow the T-PED to begin processing touch inputs independently until the end of a PIN entry sequence is found. This means that the T-PED is provided with the following information:

Calibration parameters that translate the touch screen coordinate system to the display coordinate system of the image displayed on the screen. Optionally, these parameters may be downloaded in advance under a secure authentication protocol just after the calibration procedure is performed as an additional layer of security;
  Location and size of the keys 0–9 ENTER and CLEAR;
  Desired maximum and minimum number of PIN input digits;
  Desired maximum elapsed time before input is aborted;
  Desired maximum number of CLEAR presses before input is aborted;
  Desired mode of touch activation, either activate target on select or on release;
  Desired cryptographic algorithm;
  Any additional data that corresponds to the required cryptographic algorithm (session keys, sequence numbers, etc.)

Since the application program is in control of the screen, it must display an image of a PIN entry pad and immediately send the T-PED a command to enter PIN mode that corresponds to the displayed image. The parameter information that must be included would be the location where each key is displayed.

Once the T-PED receives this command, the T-PED will begin processing touches in PED mode. As touches are determined by the touch controller, they are calibrated within the T-PED using the values specified in the "Input Mode Select" command. During PED mode, the T-PED will send requests to the computer using protocol commands, described below, for the following:

Request to sound 'good' tone or 'bad' tone. This allows the T-PED to indicate an error to the user such as too many digits pressed, too few digits entered, current selection is not a digit, etc.
  Request to inform user of successful entry of a digit. This allows the T-PED to provide feedback to the user without revealing any secure data. The reason for this feedback is to provide the user with some confidence that the system is accepting their input, otherwise, the user may think that the system has malfunctioned.
  Request to inform the user that the CLEAR key has been successfully pressed.

The T-PED will remain in PIN input mode until one of the following conditions is met:

A successful sequence of digits has been entered, followed by the ENTER key being pressed; or
  Timeout without successful entry of an allowable number of digits followed by ENTER; or
  Too many retries pressing the CLEAR key.

If a timeout or too many retries pressing the CLEAR key is detected by the T-PED, the T-PED will send an abort message to the computer.

At the conclusion of PIN entry mode, the TPED will return to the computer a successful encrypted PIN block or an indication of an unsuccessful PIN entry. Once the application acknowledges the conclusion of PIN mode, the T-PED will return to default touch screen mode, returning coordinates (relative or absolute) of each user interaction.

The following is an example of an application program utilizing a touch screen as a conventional touch screen and as a PED.

1. Computer sends T-PED the "Input Mode Select" command set to "Select Clear Mode".
2. Computer displays on the touch screen a menu of choices, such as 'Exit', 'Buy Flowers', or 'More Choices'.
3. Computer waits for user input
4. When the T-PED receives a touch, the following is returned to the computer:
   A. Touch down at 45,305
   B. Touch continued at 45,305
   C. Touch continued at 45,305
   D. Touch release at 45,305
5. After input A, the computer plays a tone to the user.
6. The computer determines the coordinate pressed is the 'Buy Flowers' key (based on application programming). The 'Buy Flowers' button is highlighted on the screen for feedback.
7. Inputs B and C have no effect on the screen, though the application program monitors them to insure that the user is not performing a 'drag' operation in which the touch is changing coordinates or that the 'Buy Flowers' button is released.
8. Once input D is received, the computer determines that the user wants to buy flowers. This requires input of an encrypted PIN.
9. The computer then informs the T-PED to enter encrypted PIN mode.
10. The computer displays an industry standard PIN pad including colors and keys as required.
11. The T-PED enters encrypted mode and the following coordinates are received:
    A. Touch down at 100,67
    B. Continued touch at 100,67
    C. Touch release at 100,67
12. After input A, the T-PED determines that the user is selecting a valid key (because the calibrated coordinates are inside a rectangle described in the 'Input Mode Select' command). Based on this, the T-PED sends the computer a request to sound a 'good tone'.
13. After input C, the T-PED determines that the user has released a touch on a valid digit. Based on this, it sends the value of the digit to the encryption system within the T-PED secure enclosure. It also sends the computer a request to provide feedback of a good digit, but it does not send the actual digit value outside of the secure T-PED enclosure.
14. This process repeats for each digit, with the T-PED processing touches until the ENTER key is pressed at a valid time.
15. The T-PED completes the encryption of all the inputs from the user and forwards the encrypted data back to the application program.
16. The application program is then free to forward this information as needed to secure a financial transaction.
17. The application program displays the next menu for the user (encrypted or otherwise), asks the T-PED to operate in the appropriate mode, and soon.

In addition to the operation of the T-PED as an input device, it must also support the protocols for encryption initialization that are required for PED operation. This can be achieved through programming on the T-PED. Encryption initialization requires the T-PED to be provided a master key to derive session keys or a sequence of derived unique keys and a unit serial number. There are ANSI and ISO standards that define command and framing for key data transfer to a device. In the preferred embodiment, the T-PED input port is programmed to understand key data commands. Once programmed, the key transfer process can be perfromed thus initializing the device with the needed encryption keys.

The T-PED system described in FIG. 3 is programmable to perform many different applications. This is an advantage, but may also be a disadvantage and liability. Due to the ECT's 310 ability to operate in encrypted and unencrypted modes, it would be possible for a fraudulent party to introduce a software program on the computer that would ask a user to input a secret PIN number without engaging the encrypting mode of the T-PED. This would render the system in a mode where touch coordinates for each digit would be sent from the T-PED to the computer (because the T-PED was not put in to encryption mode) thus making the users' secret code subject to fraudulent disclosure. This approach is known in the art as a 'Trojan Horse' attack on the security provided by the inherently safe T-PED design.

To secure the system from a Trojan Horse attack, the industry accepts two methods of overcoming the attack: cryptography and policy. Where policy is used, an implementor of the system would be responsible for securing access to the computer and thus insure that no fraudulent content is introduced. The policy would be that the system should be carefully guarded and periodically reviewed for integrity. Where cryptography is used, the system would be protected by removing all access to the computer except for a cryptographically secure upgrade communication channel. This channel would allow new applications and content to be loaded on to the computer, but these could only be loaded from a known authenticated source that would by definition be protected through policy. A large set of systems, for example, could be centrally controlled by a bank or other institution through the use of the industry standard Secure Sockets Layer (SSL) communication that would guarantee that any updates to the computer would be certified and secure to use the T-PED in its proper modes of operation.

The above-described embodiments are given as illustrative examples only. It will be readily appreciated that many deviations may be made from the specific embodiments disclosed in this specification without departing from the scope of the invention. Accordingly, the scope of the invention is to be determined by the claims below rather than being limited to the specifically described embodiments above.

What is claimed is:

1. A system for selectively generating encrypted or non-encrypted data within a touch screen device and transmitting the data to a remote processor via a data bus, comprising:
   (A) sensing means for detecting the coordinates of a touch on the touch screen device;
   (B) toggling means for toggling between an encryption and non-encryption mode, said toggling means responsive to a mode selection communicated via said data bus; and
   (C) a processor for:
      (i) encrypting data associated with the coordinates of the touch and transmitting the encrypted data to the remote processor via said data bus, if the toggling means is in the encryption mode; and
      (ii) transmitting data associated with the coordinate of the touch in an unencrypted format to the remote processor via said data bus, if the toggling means is in the non-encryption mode.

2. The system of claim 1, wherein the processing means encrypts multiple coordinates, associated with a plurality of touches on the touch screen device, into a block and transmits the block to the remote processor.

3. The system of claim 1, wherein the toggling means remains in the encryption mode until a timeout occurs.

4. The system of claim 1, wherein the sensing means, the toggling means, and the processing means are housed in a tamper resistant housing.

5. The system of claim 4, wherein the tamper resistant housing includes the sensing means, the toggling means, and the processing means mounted on each other.

6. The system of claim 1, wherein the sensing means comprises a resistive touch screen.

7. The system of claim 1, wherein the sensing means comprises a Surface Acoustic Wave touch screen.

8. The system of claim 1, wherein the sensing means comprises an analog waveform touch screen.

9. The system of claim 1, wherein the processing means utilizes Data Encryption Standard (DES) with master/session key management for encrypting data associated with the coordinates of the touch.

10. The system of claim 1, wherein the processing means utilizes Derived Unique Key Per Transaction (DUKPT) key management for encrypting data associated with the coordinates of the touch.

11. The system of claim 1, wherein the data associated with the coordinates of the touch is a Personal Identification Number (PIN).

12. The system of claim 1, wherein the data associated with the coordinates of the touch is a fleet card number.

13. The system of claim 1, wherein the processing means is a microcontroller using address encryption and self-destructing circuitry.

14. A system for selectively generating encrypted or non-encrypted data within a touch screen device, comprising:
   (A) a remote processor for receiving the encrypted or non-encrypted data via a data bus;
   (B) sensing means for detecting the coordinates of a touch on the touch screen device;
   (C) toggling means responsive to a mode selection command received via said data bus from the remote processor, for toggling between an encryption and non-encryption mode; and
   (D) a processor for:
      (i) encrypting data associated with the coordinates of the touch and transmitting the encrypted data to the remote processor via said data bus, if the toggling means is in the encryption mode; and
      (ii) transmitting data associated with the coordinates of the touch in an unencrypted format to the remote processor via said data bus, if the toggling means is in the non-encryption mode.

15. The system of claim 14, wherein the remote processor controls a pay terminal.

16. The system of claim 14, wherein the remote processor controls an order entry terminal.

17. The system of claim 14, wherein the processing means is programmable.

18. The system of claim 14, wherein the processing means transmits the encrypted data to the remote processor using Secure Sockets Layer (SSL) communication.

19. A method for selectively generating encrypted or non-encrypted data within a touch screen device and transmitting the data to a remote processor via a data bus, comprising the steps of:

(A) detecting the coordinates of a touch on the touch screen device;

(B) toggling between an encryption and non-encryption mode in response to a mode selection communicated via said data bus;

(C) encrypting data associated with the coordinates of the touch and transmitting the encrypted data to the remote processor via said data bus, if the toggling means is in the encryption mode; and (D) transmitting data associated with the coordinate of the touch in an unencrypted format to the remote processor via said data bus, if the toggling means is in the nonencryption mode.

20. The method of claim 19, wherein the processing step encrypts multiple coordinates, associated with a plurality of touches on the touch screen device, into a block and transmits the block to the remote processor.

21. The method of claim 19, wherein the method remains in the encryption mode until a timeout occurs.

22. The method of claim 19, wherein the processing step utilizes Data Encryption Standard (DES) with master/session key management for encrypting data associated with the coordinates of the touch.

23. The method of claim 19, wherein the processing step utilizes Derived Unique Key Per Transaction (DUKPT) key management for encrypting data associated with the coordinates of the touch.

24. The method of claim 19, wherein the data associated with the coordinates of the touch is a Personal Identification Number (PIN).

25. The method of claim 19, wherein the data associated with the coordinates of the touch is a fleet card number.

26. The method of claim 19, wherein the processing is performed by a microcontroller using address encryption and self-destructing circuitry.

27. A method for selectively generating encrypted or non-encrypted data within a touch screen device, comprising:

(A) detecting the coordinates of a touch on the touch screen device;

(B) toggling between an encryption and non-encryption mode in response to a mode selection communicated via a data bus;

(C) encrypting data associated with the coordinates of the touch and transmitting the encrypted data to the remote processor via said data bus, if the toggling means is in the encryption mode;

(D) transmitting data associated with the coordinates of the touch in an unencrypted format to the remote processor via said data bus, if the toggling means is in the nonencryption mode; and (E) processing the transmitted data at the remote processor.

* * * * *